UNITED STATES PATENT OFFICE.

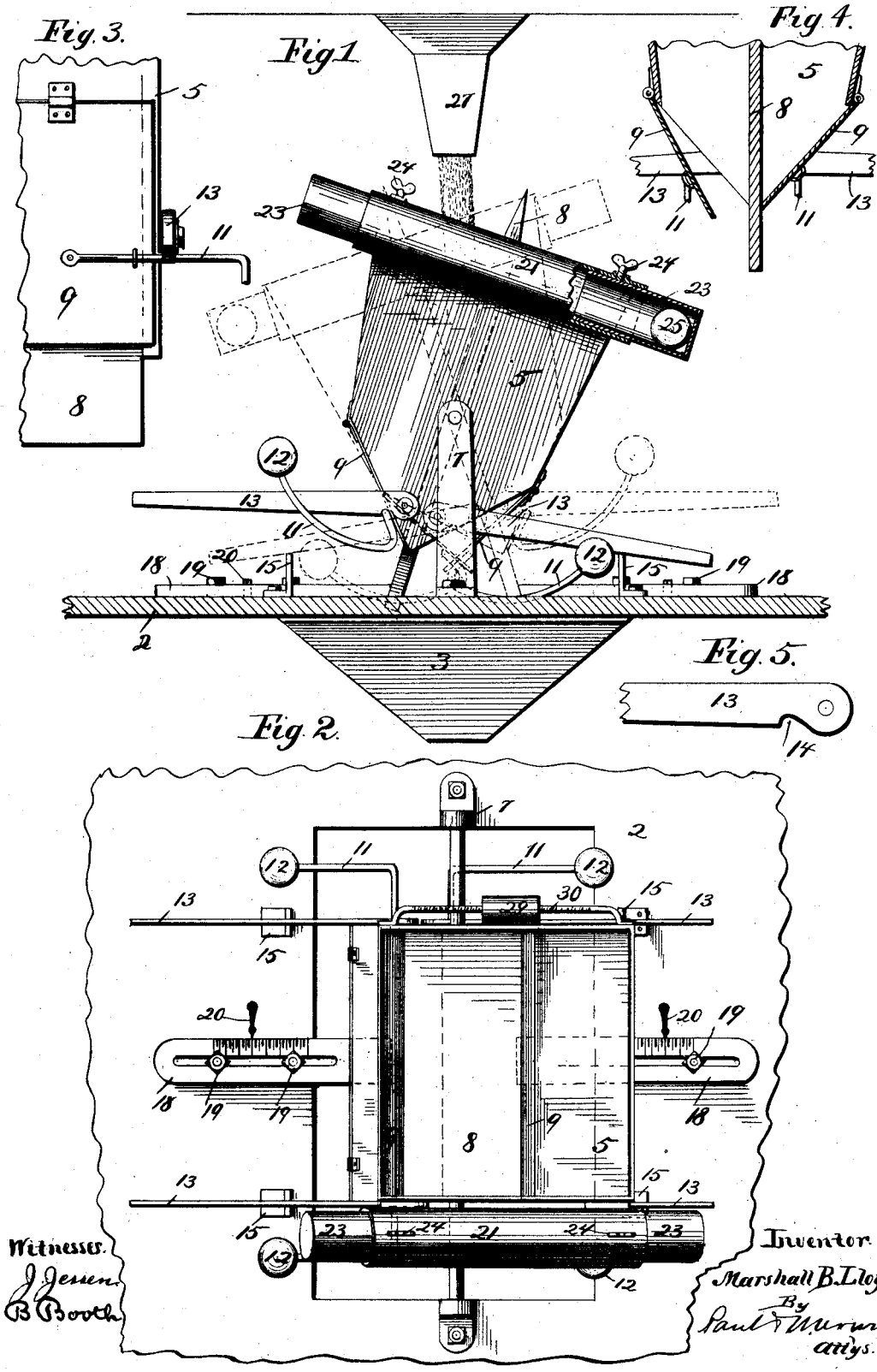

MARSHALL B. LLOYD, OF MINNEAPOLIS, MINNESOTA, ASSIGNOR OF ONE-HALF TO EDWARD H. HOLBROOK, JR., OF SAME PLACE.

AUTOMATIC GRAIN-SCALE.

SPECIFICATION forming part of Letters Patent No. 430,867, dated June 24, 1890.

Application filed July 18, 1889. Serial No. 317,852. (No model.)

*To all whom it may concern:*

Be it known that I, MARSHALL B. LLOYD, of Minneapolis, in the county of Hennepin and State of Minnesota, have invented certain new and useful Improvements in Automatic Grain-Scales, of which the following is a specification.

The object of this invention is to provide an automatic scale adapted especially for measuring, by weight, wheat, oats, barley, or other kinds of grain, although applicable for measuring other materials.

The invention consists, generally, in combining with a pivoted measuring-receptacle that is divided into separate compartments and is arranged so as to be tilted to bring first one compartment and then the other under a suitable filling-spout, a traveling ball that is arranged to move back and forth in a suitable way arranged upon said hopper, and doors which are alternately opened for the purpose of discharging the material from the compartments of the hopper.

In the accompanying drawings, forming a part of this specification, Figure 1 is a side elevation with a portion thereof broken away representing my improved device. Fig. 2 is a plan view of the same. Fig. 3 is a detail of a portion of one of the doors. Fig. 4 is a detail section of the lower portion of the hopper, showing one of the doors open and the other closed. Fig. 5 is a detail side elevation of a portion of one of the notched locking-bars.

In the drawings, 2 represents a suitable base or support upon which the device is secured. There is a suitable opening provided in the support through which the grain passes from the hopper, and a collecting-spout 3 is preferably arranged below this support and receives the grain after it leaves the hopper and conducts it into a suitable receptacle. A suitable hopper 5 is pivoted in standards or supports 7 that are arranged upon the base 2. The hopper 5 is arranged so as to be oscillated or tilted upon the standards 7 and to stand in a position that is inclined either to the right, as shown in full lines in Fig. 1, or to the left, as shown in dotted lines in the same figure. The hopper is also provided with a partition 8, preferably arranged centrally therein and extending above the top of the hopper, as shown in Fig. 1. The hopper is also provided with two swinging doors 9, one for each compartment. These doors are hinged at their upper edges to the wall of the hopper and are arranged upon an incline. Each door is also preferably provided at each end with a rod 11, which extends laterally therefrom and then extends backward from the door, and is provided at its end with a ball or weight 12. When the hopper is turned upon its pivot, the door upon the side of the hopper, which is then the lower side, will open by gravity and the door upon the other side will be held closed by the weights 12, as shown in Fig. 1.

Secured to the hopper at each side thereof are the bars 13, each of which is provided with a notch or recess 14, which is adapted to engage and lock the rod 11. These bars 13 are pivoted to the hopper and extend therefrom above the rods 11, and when not otherwise supported they rest upon said rods 11. When the doors 9 are closed, as shown at the left hand in Fig. 1, the notches 14 in the bars 13 will engage the rods 11 and lock the doors in this position.

Arranged upon the support 2 at each side of the hopper are the stops 15, which are placed in such position that as the hopper is tilted the bars 13 strike upon these stops before the hopper has reached the limit of its movement, and the bars being thus arrested will be turned upon their pivots and the notches 14 in them will disengage from the rods 11. The door upon that side of the hopper will then be free to open.

The central partition 8 of the hopper is preferably extended below the lower end of the hopper, as shown in Figs. 1 and 4, and arranged at each side of the hopper is a slide 18, against the end of which the lower portion of the partition 8 strikes, thus limiting the movement of the hopper. The slides 18 are preferably slotted, and may be held in position upon the support 2 by bolts 19. I also prefer to provide a series of graduations or marks upon the slide 18, and to provide a pointer or indicator 20, which will show the position in which the slide should be set when the device is to be used for measuring any particular kind of grain.

Extending transversely upon the upper part of the hopper is a suitable way 21, which is preferably formed of a section of tubing secured to the hopper and having the end pieces 23, which are arranged to telescope therewith, being secured in position by suitable screws 24 or other suitable fastening devices. Arranged in the way 21 is a ball 25, that is adapted to travel back and forth therein as the hopper is tilted in one direction or the other. The length of the way, and therefore the limit of travel of the ball, is determined by the position of the end sections 23 of the tube.

The hopper is arranged when the device is to be used beneath a suitable spout 27, from which the grain will pass into one of the compartments in the hopper.

The operation of the device is as follows: The parts being in the position indicated by full lines in Fig. 1, the ball will be at the lower or right-hand end of the tube or way, and the compartment at that side of the hopper will be in the lower position and its door will be open. The top of the other compartment will be over and in a vertical line with the pivots of the hopper, and the door of this compartment will be closed and locked by the engagement of the bar 13 with the rod 11. The grain or material passing through the spout 27 will enter the upper compartment or the one whose door is closed. The grain or material will accumulate therein until there is a certain predetermined weight of material in the compartment. The hopper will then begin to tilt in the other direction, and after it has moved a part of the distance the ball 25 will roll to the other end of the way. The momentum of the ball will be sufficient to carry the hopper into the position shown by dotted lines, causing the bar 13 to strike upon the stop 15, and raising that bar from the rod 11. The door 9 will now be unlocked and the weight of the grain in the compartment will cause it to open and the grain will run out. While this movement of the hopper is taking place the door of the other compartment will be closed by the weight 12 and locked by the engagement of the bar 13 with the rod 11. The grain or other material passing from the spout 27 will enter the other compartment, and when this has been filled so that a certain predetermined weight of material has accumulated therein the hopper will tilt in the other direction and the grain or other material will be discharged from this compartment. These operations will be repeated as long as the material is supplied to the device through the spout 27.

It will be seen that the operation of the device is entirely automatic and that there is no complicated mechanism to get out of order. It will also be seen that the device may be used to measure any predetermined amount of material. The nearer the hopper stands to a vertical position while the compartments are being filled the less material will be required to operate it. By changing the positions of the slides 18 the amount of movement given to the hopper may be regulated. The device may also be further adjusted for the same purpose by increasing or diminishing the travel of the ball. The hopper may also, if preferred, be provided with an adjustable weight 29, arranged upon a threaded rod 30, extending across the end of the hopper. By means of this weight the two sides of the hopper and the devices supported thereon may be made to exactly balance each other.

I claim as my invention—

1. The combination of the tilting hopper divided into two compartments by a central partition and provided also with doors arranged to be automatically opened as said hopper is tilted, a way extending transversely of said hopper above its pivotal support and provided with adjustable end pieces having closed ends, and a ball arranged in said way and adapted to travel therein, substantially as described.

2. The combination, with the tilting hopper, of the sliding plates adapted to be moved to and from the hopper to limit the movement of the latter, means for securing said plates to their adjustment, and a scale to determine the degree of adjustment, substantially as and for the purposes set forth.

3. The combination of the tilting hopper provided with swinging doors on opposite sides of a dividing partition, rods 11, connected to said doors and extended beyond the side of the hopper and thence rearwardly from the doors and having weighted ends, and bars 13, pivoted to the hopper and extended, as shown, beyond the rods 11 and adapted to engage said rods to one side of the hopper to hold the doors closed, and stops for said bars to strike against in the oscillations of the hopper, whereby said doors are automatically locked and unlocked, substantially as and for the purposes set forth.

4. The combination of the tilting hopper having a dividing partition and a projection below the bottom of the hopper, a transverse way at the upper part of the hopper, with stops to regulate the play of a ball therein, hinged doors to the hopper having rods extending therefrom, bars pivoted to the hopper and formed with notches to engage said rods and hold the doors closed, stops for said pivoted bars to strike against to automatically open the doors, and sliding plates located at the base of the scales adjacent to the projection below the hopper to limit the swinging of the hopper, substantially as and for the purposes set forth.

In testimony whereof I have hereunto set my hand this 20th day of June, 1889.

MARSHALL B. LLOYD.

In presence of—
T. D. MERWIN,
A. M. GASKILL.